United States Patent [19]

Drucker

[11] 3,979,597
[45] Sept. 7, 1976

[54] SOLAR POWER PLANT

[76] Inventor: Ernest R. Drucker, 86 Saginaw Crescent, Ottawa, Canada, K2E 5N7

[22] Filed: Mar. 10, 1975

[21] Appl. No.: 557,181

Related U.S. Application Data

[63] Continuation-in-part of Ser. No. 447,361, March 5, 1974.

[52] U.S. Cl. ............................. 290/55; 60/641; 126/270; 290/1 R
[51] Int. Cl.² .................. F24J 3/02; F03G 7/04
[58] Field of Search ............... 290/1; 60/641, 650, 60/682; 126/270, 271

[56] References Cited
UNITED STATES PATENTS

| | | | |
|---|---|---|---|
| 1,946,184 | 2/1934 | Abbot | 60/641 |
| 3,048,006 | 8/1962 | Goodman | 60/641 |
| 3,436,908 | 4/1969 | Van Delic | 60/641 |

FOREIGN PATENTS OR APPLICATIONS

| | | | |
|---|---|---|---|
| 369,199 | 11/1906 | France | 60/641 |

*Primary Examiner* — Robert K. Schaefer
*Assistant Examiner* — John W. Redman

[57] ABSTRACT

A solar energy powerplant has a group of tall, vertical towers open at both ends and containing a plurality of wind-powered impellers mounted in vertically spaced locations within each tower, such that thermal updrafts in the tower drives the impellers. Vertically spaced, radially projecting heating chambers are mounted externally on each tower and each chamber has an air inlet to admit ambient air and an air outlet into the tower for heated air. The heated air entering the tower for the solar heating chambers forms an updraft for powering the impellers. The heating chambers also contain heat exchange tubes which connect with an insulated water reservoir in the base for the towers.

7 Claims, 9 Drawing Figures

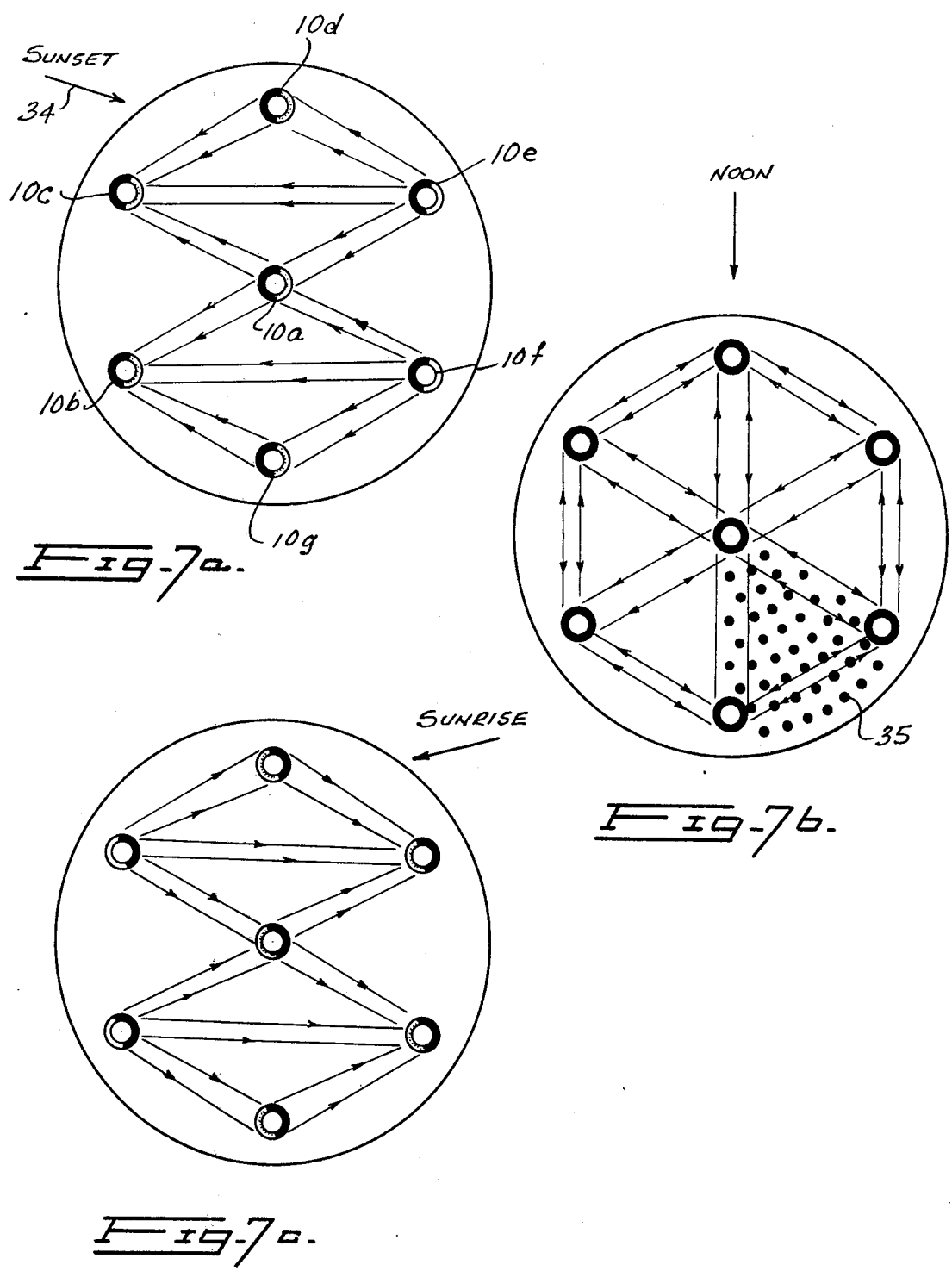

SOLAR POWER PLANT

This is a continuation-in-part of Ser. No. 447,361, filed Mar. 5, 1974.

BACKGROUND OF THE INVENTION

1. Field of the Invention

This invention relates to a system for producing electrical energy, particularly with the use of solar heat as the prime energy source.

2. Description of the Prior Art

The patent literature is replete with systems utilizing wind, waves, and solar heat as energy sources for generating electrical power. The main sources of electrical power in the world today are hydroelectric systems and fossil fuel powered generating systems. The next most significant source of electrical power is nuclear powered generators.

As far as hydroelectric power is concerned, the power generators must be reasonably close to their ultimate market and the heavily populated and industrialized sections of the world are fast using up all available new sources of hydro power. The systems powered by fossil fuels such as coal, gas and oil have the problem that these fuels are now becoming in short supply and also are becoming extremely expensive. The nuclear systems are not only very expensive in terms of construction costs but they also have the problem of requiring extensive safety systems to protect against the radiation in the plant itself. Moreover, there is also the major problem of safely disposing of the highly dangerous wastes.

Because of these problems with the traditional systems, there has been a greatly increased interest in solar energy as a major energy source. Various systems have been proposed involving the use of solar energy for generating electrical power and some such systems have recently been developed for space vehicles; see, for instance, Canadian Pat. No. 718,175, issued Sept. 21, 1965. That system uses a solar energy absorber for heating a liquid which vapourizes to drive a turbine which in turn drives a generator. Such a system with its vapourizing and condensing systems is obviously practical only for very small systems such as would be used in space crafts.

There are many patents in existence which describe the use of wind power for driving electrical generators and one quite recent form of wind turbine generator is that described in U.S. Pat. No. 3,720,840 issued Mar. 14, 1973. In Goodman, U.S. Pat. No. 3,048,066, a vertical stack arrangement is described having a series of fans driven by solar created thermal currents, with the fans being capable of driving electric generators.

The failure of ground level solar energy collectors in the past has been related to an inadequate collection area. Thus, it is known that for a sunny region such as Texas, an average heat absorption of an optimally tilted collector is about 0.45 kw/m² as a year round average sunny, daylight hours. On this basis it has been estimated that a collector area of 37 square miles would be required for a 1000 mw power plant.

Of course, it is highly desirable to have these plants close to major population areas and in these areas land is at a premium. It is, therefore, the object of the present invention to provide a solar energy power plant which is capable of greatly decreasing the land area requirements for a given amount of power production.

SUMMARY OF THE INVENTION

In accordance with the present invention there is provided a system for producing electrical energy having as a principle component a group or cluster of tall, vertical towers. A plurality of wind-powered impellers are mounted in vertically spaced locations within each tower such that up-drafts in the chimney drive the impellers. These impellers drive electrical generators. A plurality of radially projecting, vertically spaced solar heating chambers are mounted on each tower, with each of these air chambers having an air inlet to admit ambient air and an air outlet leading to the tower. In this manner ambient air is drawn into the chambers where it is heated by solar energy and passes into the tower to create the updrafts to power the impellers. A reservoir for heat exchange liquid is provided at the base of the tower and heat exchangers are mounted within each of the heating chambers and are connected to conduits for recirculating flow of heat exchange liquid between the heat exchangers and the reservoir.

The towers are very tall relative to their diameters since this produces the highest upward air velocities. For instance, at the 200 foot level of a relatively narrow tower the upward air velocity is in the order of 60 mph. Since the power of a wind-driven impeller is proportional to cube of the wind velocity, it is advantageous to concentrate the impellers at the highest possible levels to take full advantage of the high wind velocities. Towers having heights of 500 ft. or more may be used and preferably the towers will be in the order of 1000 ft. high. The mean diameter of each tower is usually less than 100 ft, while the heating chambers typically project from the tower a distance at least equal to half the radius of the tower. At any given height the heating chambers are usually spaced vertically by a distance of about 10–20 ft., with each chamber typically having a height of about 1–3 ft.

Also, an important feature of this invention is that by providing these high towers in combination with the plurality of radially projecting, vertically spaced solar heating chambers mounted on the tower, a very large effective solar energy collecting area is provided directly on the tower itself rather than the usual method of using ground collectors spread over a large area. This arrangement takes special advantage of the fact that through almost the entire period of sunlight in each day the rays of the sun are at an angle to the vertical.

The towers are arranged in clusters with concave mirrors being mounted on the outer most edges of the heating chambers whereby the sides of the towers remote from the sun within the cluster can be heated by reflected solar rays. In this manner the maximum utilization of the solar rays can be achieved within the cluster.

A particular advantage of these clusters of towers is that they can be constructed in the form of islands and placed offshore near large population areas. In this way they can avoid the use of very valuable land near these areas of high population density.

DESCRIPTION OF THE PREFERRED EMBODIMENTS

The impellers can be selected from a variety of different types presently available, it being appreciated that any arrangement of blades or vanes which will turn a shaft to which they are attached when exposed to wind may be called a wind-powered impeller. Among suitable impellers there can be mentioned the multi-blade turbine wheel (American type), propellor-type high speed wheel, etc.

The impellers can be mounted to turn on either horizontal or vertical axes. For maximum utilization of the air currents created within each tower it is advantageous to have a large number of independent impellers, each including an integral power generating unit in the form of an alternator operating directly from the rotating impeller shaft. Deflector blades are also provided for guiding the air currents against the impeller blades and minimizing losses.

Each tower can have an independent base or the cluster of towers can be mounted on a single large base. This base includes a large insulated reservoir for holding heat exchange liquid, preferably water. This serves as a collector of energy in the form of hot water during periods of high solar radiation and this heated water can then be used during nights and heavily clouded periods as a source of heat for creating the tower updrafts.

The base also preferably incorporates an incinerator for burning waste materials, such as garbage. The heat generated by the incinerator can either be allowed to go up the tower to provide air flow for driving the impellers or it can be used for heating the water in the reservoirs by way of heat exchangers.

According to a preferred feature of the invention, the hot water produced by the solar heating chambers and the incinerator also utilized to produce steam. The hot water is converted into steam through a heat exchange pump, with the pressure (energy) for part of the heat exchange pump being available through harnessing of the wind power. The steam thus obtained is used to power a steam turbine generator to produce electricity.

Thus, it will be seen that the system of this invention is a combined comprehensive energator which uses solar energy for the production of electrical energy and is also capable of utilizing the same system for the practical disposal of waste materials. With the combination of direct solar heating, heat storage and waste incineration, it is possible to generate electricity with the system even during periods of very low solar energy availability.

The device is preferably provided with automatic controls which regulate the air flow travelling up the tower. This can be done by measuring the impeller speeds within the tower and utilizing this to control dampers on inlet air at the base of the tower as well as from the solar heating chambers. Thus, for instance, during periods of peak solar radiation only a minimum amount of solar energy may be required to provide convection air flow up the tower and the remainder of the solar energy can then be entirely concentrated in heating the water reservoir. On the other hand, during periods of minimum solar radiation, ambient air is directed through the heat exchange zones where this air picks up heat from the hot water of the reservoirs. In this way, the constant upward air flow through the tower is maintained.

The invention is further illustrated by the attached drawings in which.

FIGS. 7a, b, and c is a schematic view of a base with a cluster of towers at various positions of the sun.

Figure 2:
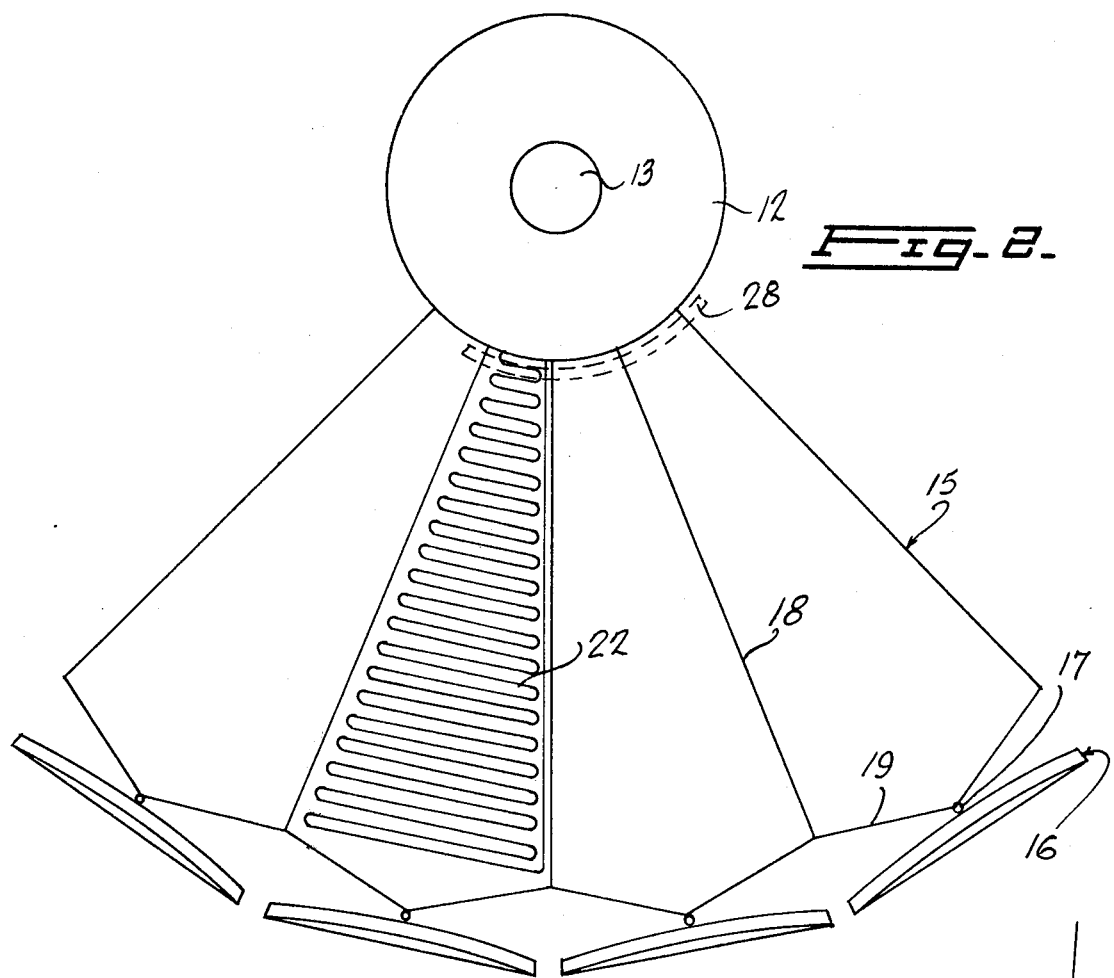
FIG. 2 is a top plan view of one tower in partial section.
Figure 3:
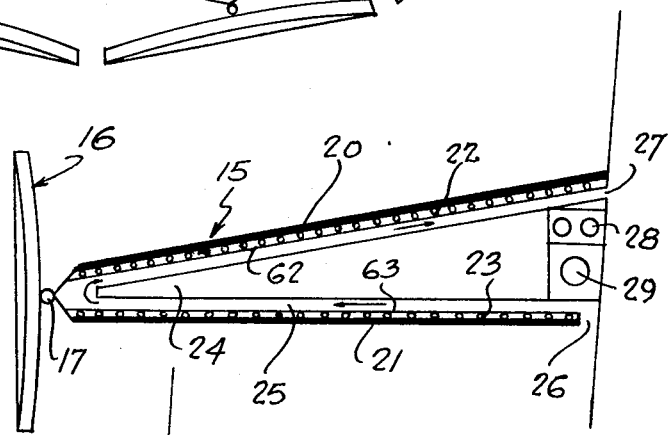
FIG. 3 is an elevation view in section showing details of one embodiment of a solar heating chamber.

The device includes a series of towers 10 each mounted on its own base portion 11. The bottom of each tower has an air inlet 12 and an air outlet 13 is provided at the top. Each tower preferably tapers inwardly toward the top and mounted on the peripheral wall 14 of the tower are a series of outwardly projection and vertically spaced solar heating chambers 15. Each of these chambers 15 is composed of a series of segments as shown in FIG. 2 divided by radial divider walls 18 and terminating in outer end walls 19. Mounted on the outer end of each chamber segment is a concave mirror 16 which is tiltable on a mounting pivot 17. As shown in FIG. 3, the solar heating chambers 15 have a top face 20 and a bottom face 21, these preferably being made from wired glass in metal frames. Directly beneath these faces 20 and 21 are copper tubing arrangements 22 and 23 respectively. These tubes carry water which is heated from the absorption of solar rays. Beneath the copper tubes are black aluminum refractory layers 62 and 63 which aid in the absorption of solar energy. Within each heating chamber compartment is an air flow deflector 24 defining an air flow path 25 along the solar heating surfaces. An inlet 26 is provided for introducing ambient air into the flow path 25 and an outlet 27 is provided in tower wall 14 for introducing heated air into the tower. At the innner end of the solar heating chambers are mounted header tubes 28 for carrying water to and from the heat exchange tubes 22 and 23. An electric motor 29 is also mounted at this inner end for tilting the concave mirrors 16.

Figure 4:
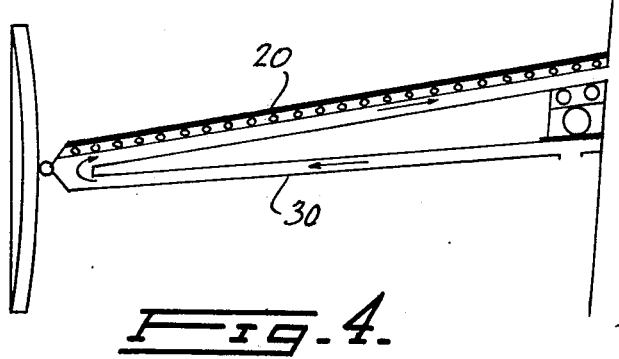
FIG. 4 is an elevation view in section showing details of an alternative design of a solar heating chamber.
Figure 5:
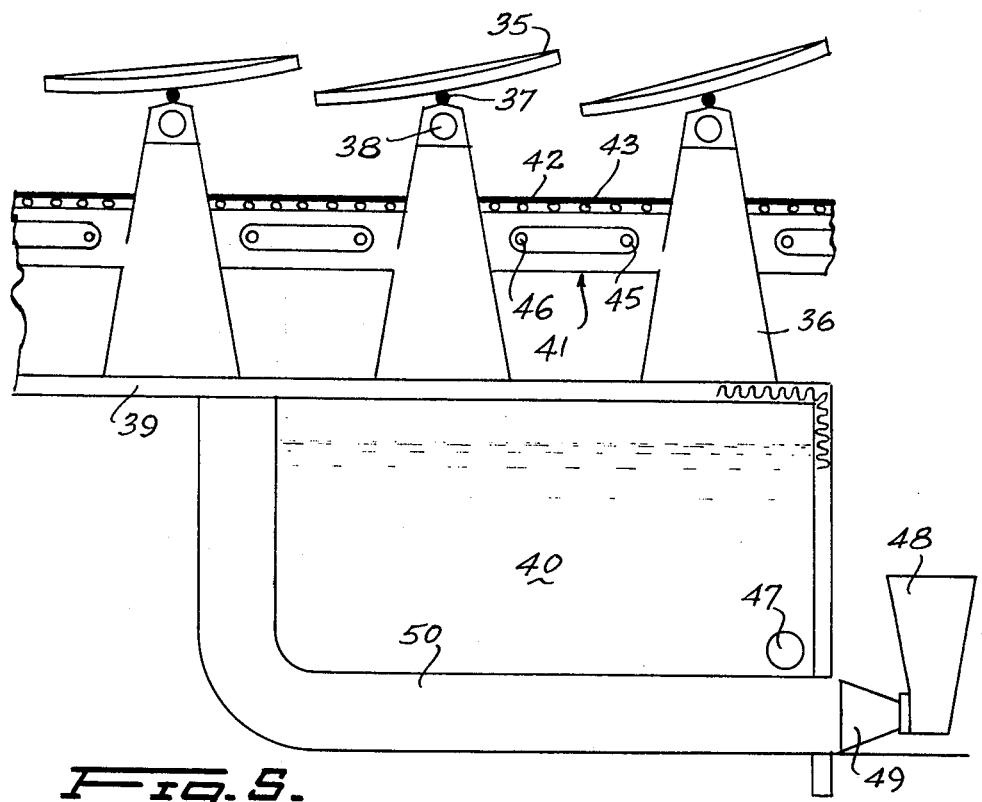
FIG. 5 is a schematic view of the base of an installation with incinerator.

A somewhat simplified version of the solar heating chamber 15 is shown in FIG. 4 in which only a simple panel 30 is provided for the bottom face so that the solar rays are absorbed only from the top face 20.

Figure 1:
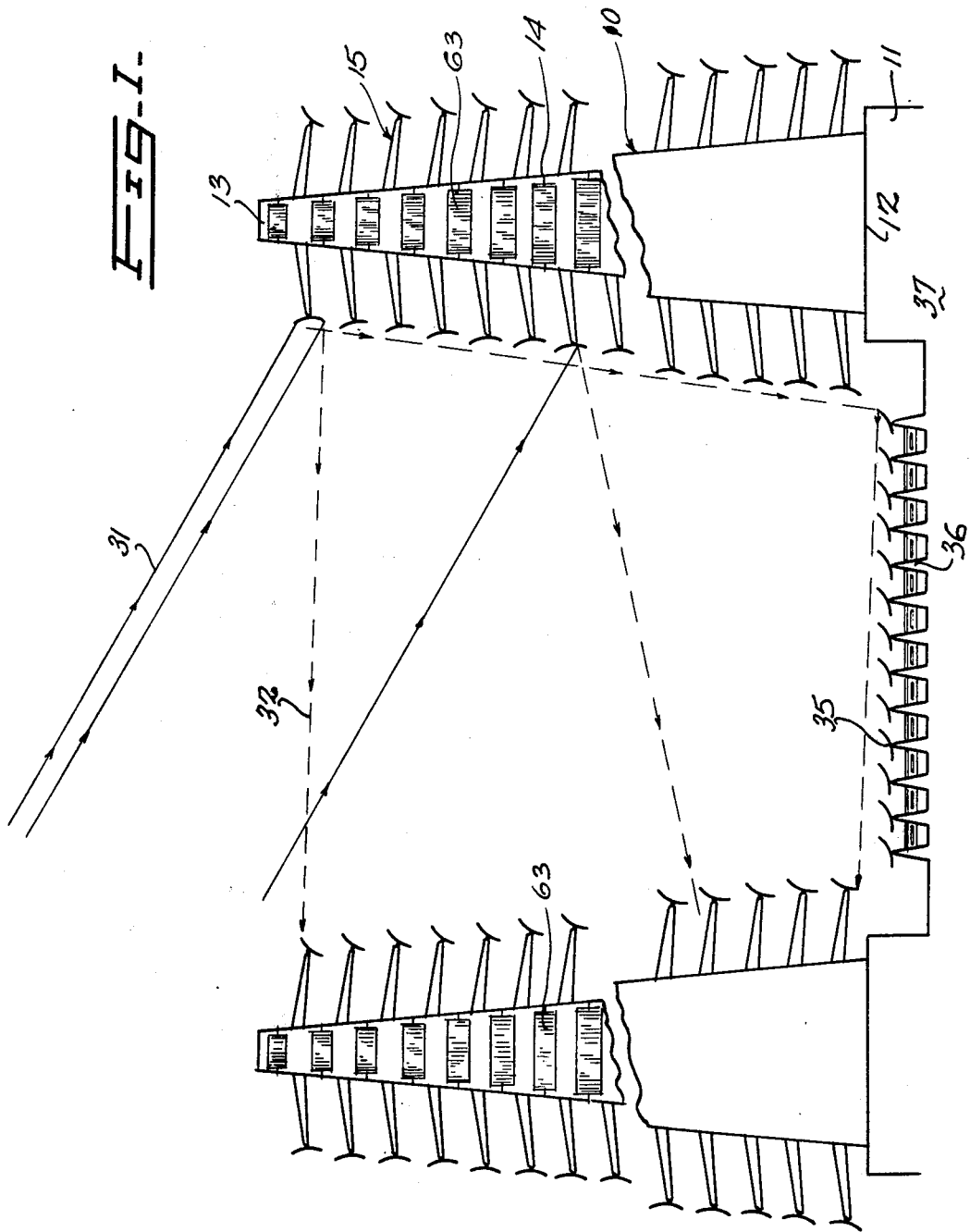
FIG. 1 is an schematic elevation view of one embodiment of the invention.

From FIG. 1 it will be seen that the direct solar rays in part strike the top faces of the heating chambers 15 and in part strike the concave mirrors 16. The reflected rays 31 from the mirrors 16 can then be used to heat the sides of adjacent towers which are not in direct line with the rays from the sun.

This can best be seen from FIGS. 7a, b and c where a cluster of 7 towers 10a, 10b, 10c, 10d, 10e, 10f and 10g are mounted in a substantially circular, equally spaced configuration on a single large base 33. The three views shown in FIG. 7 represent the sun rays 34 striking a tower cluster at different angles and the patterns of reflected solar rays for the different positions of the sun are schematically illustrated. In the areas of the large base 33 between the towers 10 are mounted further banks of concave mirrors 35 which are supported on support members 36. Each of these mirrors 35 is mounted on support 36 by means of a pivotal member 37 and an electric motor 38 is provided for tilting these mirrors to the desired position and angle.

The supports 36 rest upon an insulated wall 39 forming the top of a large water reservoir 40. Also positioned between the supports 36 are further heating chambers 41, each of these having a top face 42 composed of wired glass in metal frames with banks of copper tubing 43 positioned beneath the wired glass and black aluminum refractor plates 44 positioned beneath the tubes 43. Air inlets and outlets are provided in the chambers 41 so that further ambient air can be heated and fed into the bottom of the towers 10 and header tubes 45 and 46 are provided for return water flow between the tubes 43 and the reservoir 40.

Also in the large base portion 33 there is mounted an incineration burner 49 with a hopper 48 for receiving recycled garbage and wastes for burning. The hot gas is produced by the burner 49 are carried via duct 50 through the water reservoir 40 to provide further water heating and these hot gases are then carried into the bottoms of the towers 10.

Figure 6:
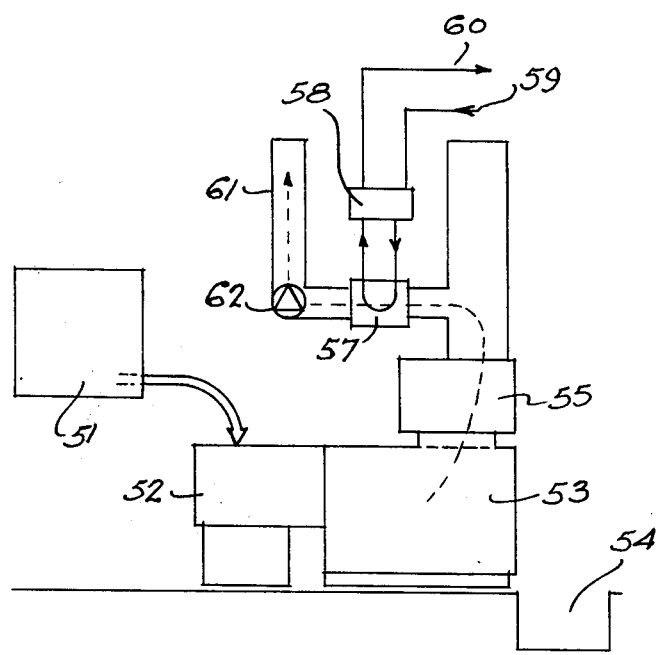
FIG. 6 is a schematic view of an incinerator installation.

A typical form of heat recovery incinerator arrangement is shown in FIG. 6, from which it will be seen that solid wastes from storage 51 are delivered into a charging assembly 52 and from there into a primary burner 53. In the primary burner the burning process is initiated under less than stoichiometric air conditions so that much of the refuse is destroyed through pyrolysis and the heat released utilized in the volatilization and gasification of hydrocarbons contained within the waste. The combustion products, together with the gaseous hydrocarbons are carried into a second chamber where additional air is injected to complete combustion of the gases, either spontaneously or aided by an after burner. Ash is removed from the primary burner into receptacle 54 while the gaseous product of the secondary burner 55 passes through a heat exchanger 57 for further heating of water. A steam drum 58 is provided and water is fed in through inlet 59 and steam emerges through outlet 60 to be used as steam supply to a turbine for producing electricity. The hot combustion gases after passing through heat exchanger 57 continue with the aid of a draft fan 62 out through duct 61 and into the bottom of the towers 10.

In FIG. 1, impellers 63 are shown mounted on horizontal axes. These impellers can either include a power take-off for driving an external generator or they can be in the form of combined windmill-generator units with an alternator unit mounted on each impeller shaft for producing electrical energy.

The concave mirrors are preferably controlled by a computer so that they are at all times at an optimum angle and tilt with respect to the angle and position of the sun. Further inputs are fed into a computer based on the rotational speed of the wind impellers, the temperature of the water emerging from the heat exchangers, the quantities and pressure of steam produced, the temperature of the reservoir water, etc. Based on such data and the electrical output demands, the computer is programmed to control the air and water flows as well as the operation of the incinerator to provide a balanced operation.

The above detailed description does not include particulars of the electrical generating equipment because this is regular commercial equipment. The invention resides in the novel apparatus which collects the solar energy and converts this into thermal air currents, hot water and steam.

From the above description, it will be seen that the device of this invention provides a fully integrated system for the generation of electricity from wind powered units within the towers as well as from steam powered turbines with a substantial portion of the basic energy being derived from solar radiation. During periods of minimum solar radiation, the large reservoir of hot water is cycled through the system to provide heat exchange for creating the necessary thermal updrafts within the towers and the incineration unit can be utilized both to supplement these updrafts as well as to convert some of the water to steam for driving steam turbines.

The embodiments of the invention in which an exclusive property or privilege is claimed are defined as follows:

1. A solar energy powerplant comprising a group of seven or more vertical towers open at both ends, said towers being mounted on a base structure in an equally spaced configuration with a single central tower surrounded by at least six towers, a plurality of vertically spaced, radially projecting heating chambers mounted externally on each tower, said chamber projecting from the tower a distance at least equal to the radius of the tower, with the chamber at each level being divided into a series of segment-shaped compartments separated by radial divider walls, each said segment-shaped compartment having an inlet for ambient air and an outlet into the tower for heated air, tiltable concave mirrors mounted on the outermost edges of the segment-shaped compartments and wind-powered impellers mounted in at least the upper half of each tower in vertically spaced locations in association with said heating chambers, said impellers being adapted to drive electrical generating units.

2. A powerplant according to claim 1, comprising a substantially circular cluster of said towers with concave mirrors being mounted on the outermost edges of the heating chambers, whereby the sides of the towers remote from the sun within the cluster are heated by reflected solar rays.

3. A powerplant according to claim 1 wherein each compartment has a substantially flat top and bottom face, at least the top face being made from wired glass in metal frames.

4. A powerplant according to claim 3 wherein heat exchange tubes are mounted directly below said wired glass.

5. A powerplant according to claim 4 wherein a black aluminum refractory layer is positioned directly below said heat exchange tubes.

6. A powerplant according to claim 1 wherein concave mirrors are mounted at the base in the regions between the towers of a cluster.

7. A powerplant according to claim 1 wherein said group of towers are mounted on a single base portion, said base containing an insulated water reservoir and an incineration burner for burning solid wastes.

* * * * *